United States Patent [19]

Uedaira et al.

[11] Patent Number: 4,677,083
[45] Date of Patent: * Jun. 30, 1987

[54] METHOD FOR MANUFACTURING DIELECTRIC FINE POWDER OF $Ba_{1-x}Sr_xTiO_3$

[75] Inventors: Satoru Uedaira; Hiroshi Yamanoi, both of Kanagawa; Takashi Yamaguchi; Masayuki Suzuki, both of Tokyo; Hidemasa Tamura, Kanagawa, all of Japan

[73] Assignee: Sony Corporation, Tokyo, Japan

[ * ] Notice: The portion of the term of this patent subsequent to May 28, 2002 has been disclaimed.

[21] Appl. No.: 693,038

[22] Filed: Jan. 22, 1985

[30] Foreign Application Priority Data

Jan. 24, 1984 [JP] Japan ................................. 59-10834

[51] Int. Cl.$^4$ ....................... C01G 23/04; C04B 35/46
[52] U.S. Cl. .................................. 423/598; 501/135; 501/136; 501/137
[58] Field of Search ..................... 501/137, 136, 135; 423/598

[56] References Cited

U.S. PATENT DOCUMENTS

| | | | |
|---|---|---|---|
| 2,758,911 | 8/1956 | Lynd et al. ........................ | 501/136 |
| 3,429,818 | 2/1969 | Di Benedetto et al. ............ | 501/137 |
| 3,647,364 | 3/1972 | Mazdiyasni et al. ............... | 423/598 |
| 3,725,539 | 4/1973 | Spangenberg .................. | 423/598 X |
| 4,058,592 | 11/1977 | Quets ................................. | 501/137 |
| 4,061,583 | 12/1977 | Murata et al. ...................... | 423/598 |
| 4,520,004 | 5/1985 | Uedaira et al. ..................... | 423/598 |
| 4,606,906 | 8/1986 | Ritter et al. ........................ | 423/598 |

FOREIGN PATENT DOCUMENTS

| | | | |
|---|---|---|---|
| 2047229 | 6/1971 | Fed. Rep. of Germany ...... | 501/135 |
| 58-4449 | 1/1983 | Japan ................................. | 501/137 |

OTHER PUBLICATIONS

"Preparation of Compounds in Barium (II) Oxide-Titanium (IV) Oxide System by Coprecipitation from Alkoxides", Suwo et al., Funtai Oyobi Funmatsuyakin, 1978, 25(5), 164–167 (Japan).

Primary Examiner—William R. Dixon, Jr.
Assistant Examiner—A. Knab
Attorney, Agent, or Firm—Hill, Van Santen, Steadman & Simpson

[57] ABSTRACT

A method for manufacturing dielectric titanate fine powder having the formula $Ba_{1-x}Sr_xTiO_3$ wherein $0<x<1$ is disclosed, which includes the steps of preparing a hydrolysis product of an inorganic titanium compound $TiO_2 \cdot xH_2O$ by dissolving the inorganic titanium compound in a neutral or alkaline aqueous solution, reacting the hydrolysis product with a water soluble salt of Ba and a water soluble salt of Sr in an aqueous alkaline solution having a pH no less than 13.0 to thereby obtain the dielectric fine powder having the formula $Ba_{1-x}Sr_xTiO_3$ wherein $0<x<1$, and filtering the fine powder from the remaining solution.

3 Claims, 6 Drawing Figures

FIG. 1
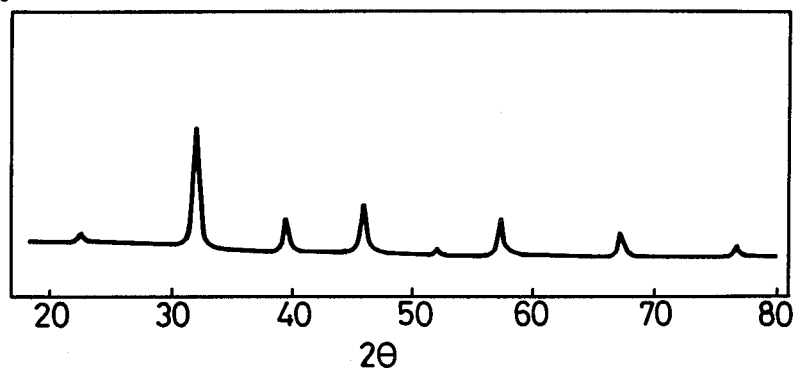
FIG. 2
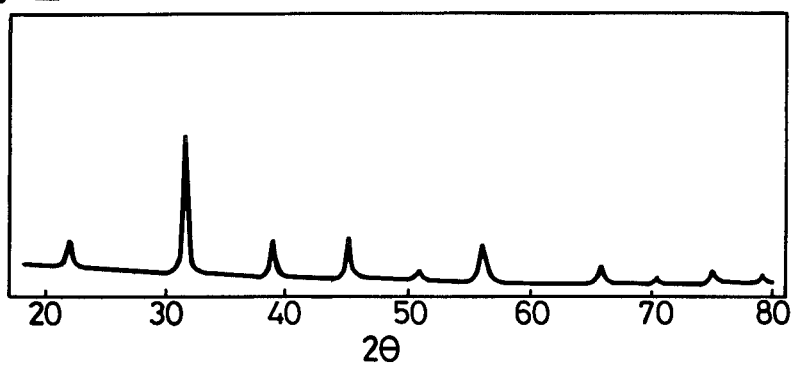
FIG. 3   0.1μ   (×100,000)
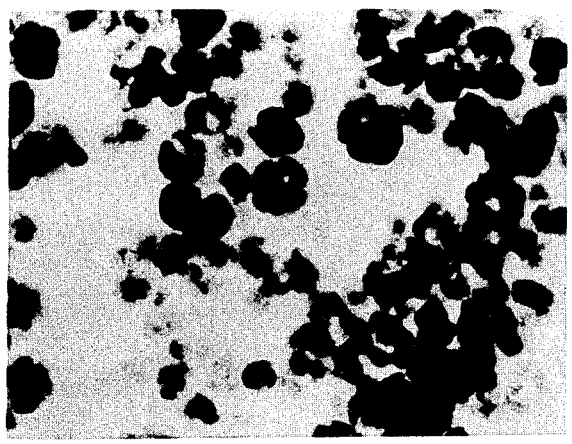

METHOD FOR MANUFACTURING DIELECTRIC FINE POWDER OF $Ba_{1-x}Sr_xTiO_3$

BACKGROUND OF THE INVENTION

1. Field of the Invention

The present invention relates to a method for manufacturing barium-strontium titanate fine powder which is known as one of dielectric materials.

2. Description of the Prior Art

Recently, a method for forming ceramic material, which is a functional electronic material, into fine powder has been studied from various angles. As one of the applications of such fine powder of the ceramic material, there is such application that the fine powder is used to produce a capacitor. As electronic products are made small in size and high in density, the capacitor is also requested to be made small in size, light in weight, large in capacitance and improved in high frequency characteristic similarly to other electronic parts. For this reason, in a ceramic capacitor, in order to make its thickness thin and uniform, the ceramic material must be formed into fine powder.

As one of such ceramic materials, there is known barium-strontium titanate $Ba_{1-x}Sr_xTiO_3 (0<x<1)$. As a prior art method for manufacturing such fine powder, there is a solid phase reaction method which uses $BaCO_3$, $SrCO_3$ and $TiO_2$ as the raw material. In this solid phase reaction method, $BaCO_3$, $SrCO_3$ and $TiO_2$ are weighted so as to make a desired composition, ground in a ball mill and then mixed to one another. Thereafter, the product is subjected to pressmolding, calcined at high temperature of 1300° to 1500° C., ground in the ball mill and the like and then subjected to to the sieving or screening treatment, thus fine powder being obtained. However, according to this solid phase reaction method, it takes a long time to grind the materials in the ball mill and in addition impurity and powder of large size are inevitably mixed to the product. Further, there is a defect that a particle size distribution grows worse and so on. As other synthesizing method, there is an oxalate method. In this method, complex metal oxalate is synthesized and then roasted to thereby make fine powder of $Ba_{1-x}Sr_xTiO_3$. According to this method, a process for synthesizing uniform complex metal oxalate is complicated and in addition, organic compound is used so that the manufacturing cost becomes high. Further, although the desired fine powder is obtained, the powder is essentially succeeding the original oxalate powder. To avoid the formation of the powder having the original oxalate structure a problem of the sintering between the powders occurs so that this method does not yet reach the industrial production stage at present. Furthermore, a method in which metal alkoxide is used to produce complex metal titanate fine powder of barium-strontium titanate $Ba_{1-x}Sr_xTiO_3$ has recently been studied and developed. This method must use special organic compound such as metal alkoxide so that the manufacturing cost thereof becomes considerably high as compared with the oxalate method.

OBJECTS AND SUMMARY OF THE INVENTION

Accordingly, it is an object of this invention to provide an improved method for manufacturing dielectric fine powder of $Ba_{1-x}Sr_xTiO_3$ wherein $0<x<1$.

Another object of this invention is to provide a method for manufacturing dielectric fine powder of $Ba_{1-x}Sr_xTiO_3$ which can produce a fine powder which is very small in diameter and uniform in particle size.

A further object of this invention is to provide a method for manufacturing dielectric fine powder of $Ba_{1-x}Sr_xTiO_3$, by which dielectric fine powder can be manufactured at low cost and with ease.

A yet further object of this invention is to provide an improved method for manufacturing dielectric fine powder of $Ba_{1-x}Sr_xTiO_3$ capable of producing a dielectric material having the maximum value of the dielectric constant with respect temperature at a desired temperature (not higher then 135° C.).

According to one aspect of this invention, there is provided a method for manufacturing dielectric titanate fine powder having the formula $Ba_{1-x}Sr_xTiO_3$ wherein $0<x<1$ comprising the steps of:

preparing a hydrolysis product of an inorganic titanium compound $TiO_2 \cdot xH_2O$ by dissolving said inorganic titanium compound in a neutral or alkaline aqueous solution;

reacting said hydrolysis product with a water soluble salt of Ba and a water soluble salt of Sr in an aqueous alkaline solution having a pH not less than 13.0 to thereby obtain said dielectric fine powder having the formula $Ba_{1-x}Sr_xTiO_3$ wherein $0<x<1$; and filtering said fine powder from the remaining solution.

The other objects, features and advantages of the present invention will become apparent from the following description taken in conjunction with the accompanying drawings through which the like references designate the same elements and parts.

BRIEF DESCRIPTION OF THE DRAWINGS

FIGS. 1 and 2 are respectively diagrams showing X-ray diffraction patterns of barium-strontium titanate fine powder made in accordance with a manufacturing method of this invention;

FIG. 3 is photograph of the fine powder manufactured by the method of this invention taken by a transmission electron microscope;

DESCRIPTION OF THE PREFERRED EMBODIMENTS

Figure 4:
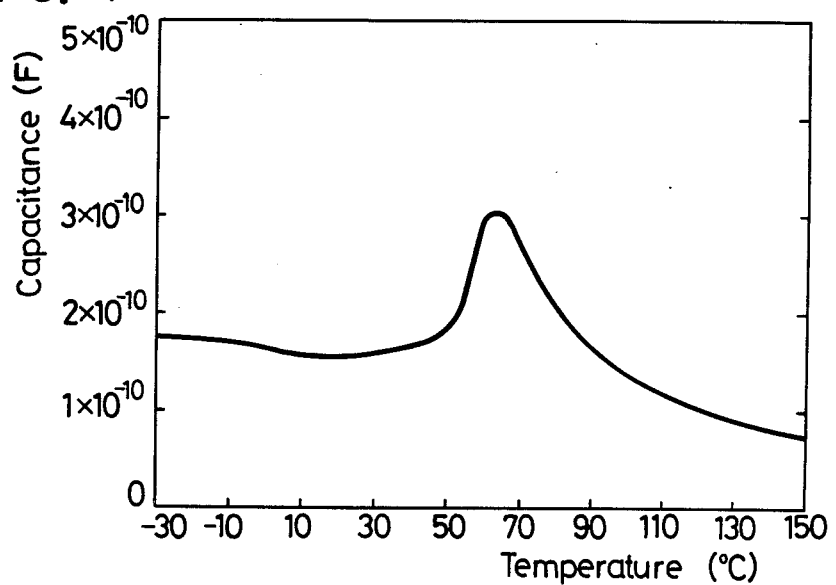
FIG. 4 is a characteristic graph showing the measured capacitance of a disc made of fine powder manufactured by this invention.

In accordance with the manufacturing method of this invention, a hydrolyzed compound of Ti compound, a water soluble salt of Ba and a water soluble salt of Sr are reacted with one another in a strong alkaline aqueous solution at a temperature of approximately the boiling point thereof. The resultant precipitate is filtered, rinsed by water and then dried, thus complex metal titanate fine powder of barium-strontium titanate $Ba_{1-x}Sr_xTiO_3 (0<x<1)$ being made.

As the hydrolyzed compound of Ti compound, there can be used such one which is provided by hydrolyzing an aqueous solution such as $TiCl_4$, $Ti(SO_4)_2$ and the like by an alkaline solution such as $NH_4OH$, $NaOH$ and so on. However, when $Ti(SO_4)_2$ is used, it is necessary that the hydrolyzed solution is repeatedly subjected to decantation and filtering so as to remove therefrom a sulfate group $SO_4{}^{2-}$.

As the water soluble salt of Ba, there can be used $Ba(NO_3)_2$, $Ba(OH)_2$, $BaCl_2$, $Ba(CH_3COO)_2$ and so on. Also, the hydrolyzed product of them can be used.

As the water soluble salt of Sr, there can be used SrO, $Sr(OH)_2$, $Sr(OH)_2 \cdot 8H_2O$, $SrCl_2$, $Sr(NO_3)_2$, $Sr(CH_3COO)_2$ and the like.

As the reaction conditions for synthesizing barium-strontium titanate fine powder, pH is selected to be not less than 13.0, the molar ratio of (Ba+Sr)/Ti is selected in a range from 0.5 to 5.0 and the reaction temperature is selected in a range from 15° C. to the boiling point thereof.

As described above, according to this invention, the complex metal titanate fine powder of barium-strontium titanate can be synthesized directly by a wet synthesizing method under normal pressure. The fine powder made by this invention has the following excellent features that the diameter of the powder is very small and uniform and in addition this fine powder has less impurity mixed thereto. As compared with the dry method such as the solid phase reaction method, the method of this invention is superior in that a better fine powder can be obtained and that the manufacturing process thereof is very simple. Further, as compared with the oxalate method and the metal alkoxide method, in addition to the fact that the size of the fine powder thus made is substantially the same as those of the above oxalate and metal alkoxide methods, no organic compound is used and hence the fine powder can be manufactured by the simple manufacturing process. As a result, the present invention is further superior in decreasing the manufacturing cost by two to three digits. Furthermore, when the fine powder made by this invention is used as the dielectric material, it is possible to make the dielectric material having Curie temperature, namely, the maximum value of the dielectric constant at a desired temperature.

The present invention will hereinafter be described with reference to examples.

EXAMPLE 1

50 g of $TiCl_4$ was dissolved into 50 ml of an iced water while being stirred so as to make a Ti aqueous solution. Then, water was added thereto to prepare the Ti aqueous solution of 500 ml. Next, 55.11 g of $Ba(NO_3)_2$ and 11.16 g of $Sr(NO_3)_2$ were added and dissolved into this aqueous solution. Thereafter, the aqueous solution was adjusted to have pH 14 by adding a KOH solution thereto and then added with water so as to be 1 l in total volume. While being stirred, this solution was reacted at 100° C. for four hours. After the reaction, the resultant precipitate was rinsed by water by decantation treatment, filtered and further rinsed by water. Thereafter, the resultant product was dried at 100° C. for all day long, to thereby obtain fine powder.

FIG. 1 shows the results in which the fine powder made by the above treatment was analyzed by an X-ray analysis (Cu target and Ni filter). From this X-ray diffraction pattern, it was confirmed that this fine powder was a single phase $Ba_{0.8}Sr_{0.2}TiO_3$ of cubic perovskite structure (x=0.2 is based on the result of chemical analysis). The lattice constant $a_0$ of this fine powder was 4.004 Å.

FIG. 3 shows a photograph of this fine powder taken by a transmission electron microscope. From this photograph, it was understood that this powder was made of fine powders which have a diameter of about 500 Å and were very uniform in size.

EXAMPLE 2

50 g of $TiCl_4$ was dissolved into 50 ml of an iced water while being stirred so as to make a Ti aqueous solution. Thereafter, water was added thereto so as to prepare the aqueous solution of 500 ml. Next, 45.92 g of $Ba(NO_3)_2$ and 18.59 g of $Sr(NO_3)_2$ were added and dissolved into this aqueous solution. Then, the aqueous solution was adjusted to have a pH 14 by adding a KOH solution thereto and water was further added thereto to prepare the aqueous solution of 1 l. While being stirred, this aqueous solution was reacted at 100° C. for four hours. The resultant precipitate was rinsed by water by decantation, filtered, further rinsed by water and then dried at 100° C. for all day long.

The X-ray diffraction pattern of the fine particle powder obtained by the above treatment was substantially the same as that shown in FIG. 1 and it was confirmed that this fine powder was $Ba_{\frac{2}{3}}Sr_{\frac{1}{3}}TiO_3$. Further, according to the transmission electron microscope, the fine powder of substantially the same shape as that in FIG. 3 was observed. The lattice constant $a_0$ of the fine powder was 3.981 Å.

EXAMPLE 3

50 g of $TiCl_4$ was dissolved into 50 ml of an iced water while being stirred so as to make a Ti aqueous solution. Then, water was added thereto to prepare the aqueous solution of 500 ml. Then, 34.44 g of $Ba(NO_3)_2$ and 27.89 g of $Sr(NO_3)_2$ were added and dissolved into this aqueous solution. Thereafter, the aqueous solution was adjusted to have a pH 14 by adding a KOH solution thereto and water was added thereto to prepare the aqueous solution of 1 l. While being stirred, this aqueous solution was reacted at 100° C. for four hours. The resultant precipitate was rinsed by water by decantation, filtered, further rinsed by water and then dried at 100° C. for all day long.

The X-ray diffraction pattern of the fine powder obtained by the above treatment was substantially the same as that of FIG. 1, and it was confirmed that this fine powder was $Ba_{0.5}Sr_{0.5}TiO_3$ of cubic perovskite structure. According to the transmission electron microscope, the fine powder of substantially the same shape as that of FIG. 3 was observed. In this case, the lattice constant $a_0$ thereof was 3.968 Å.

EXAMPLE 4

50 g of $TiCl_4$ was dissolved into 50 ml of an iced water while being stirred so as to make a Ti aqueous solution. Then, water was added thereto to prepare the aqueous solution of 500 ml. Next, 22.96 g of $Ba(NO_3)_2$ and 37.18 g of $Sr(NO_3)_2$ were added and dissolved into this aqueous solution. Thereafter, this aqueous solution was adjusted to have a pH 14 by adding a KOH solution thereto and water was further added thereto to prepare the aqueous solution of 1 l. While being stirred, this aqueous solution was reacted at 100° C. for four hours. The resultant precipitate was rinsed by water by decantation, filtered, further rinsed by water and then dried at 100° C. for all day long.

The X-ray diffraction pattern of the fine powder made by the above treatment was substantially the same as that of FIG. 1, and it was confirmed that this fine powder was $Ba_{\frac{1}{3}}Sr_{\frac{2}{3}}TiO_3$ of cubic perovskite structure. Further, according to the transmission electron microscope, the fine powder of substantially the same shape as that of FIG. 3 was observed. In this case, the lattice constant $a_0$ thereof was 3.948 Å.

EXAMPLE 5

50 g of $TiCl_4$ was dissolved into 50 ml of an iced water while being stirred so as to make a Ti aqueous solution. Then, water was added thereto to prepare the aqueous solution of 500 ml. Then, 13.78 g of $Ba(NO_3)_2$ and 44.63 g of $Sr(NO_3)_2$ were added and dissolved into this aqueous solution. Thereafter, this aqueous solution was adjusted to have a pH 14 by adding a KOH solution thereto and water was further added thereto to prepare the aqueous solution of 1 l. While being stirred, this aqueous solution was reacted at 100° C. for four hours. The resultant precipitate was rinsed by water by decantation, filtered, further rinsed by water and then dried at 100° C. for all day long.

The X-ray diffraction pattern of the fine powder obtained by the above treatment was as shown in FIG. 2 and it was confirmed that this fine powder was $Ba_{0.2}Sr_{0.8}TiO_3$ of cubic perovskite structure. Comparing the X-ray diffraction patterns of the fine powders of five kinds in Examples 1 to 5, it was made clear that as the value x becomes large, namely, in accordance with the sequential order from Example 1 to Example 5, the diffraction peak was shifted in the order. Further, according to the transmission electron microscope, the fine powder of substantially the same shape as that of FIG. 3 was observed in this example. In this case, its lattice constant $a_0$ was 3.936 Å.

Figure 5:
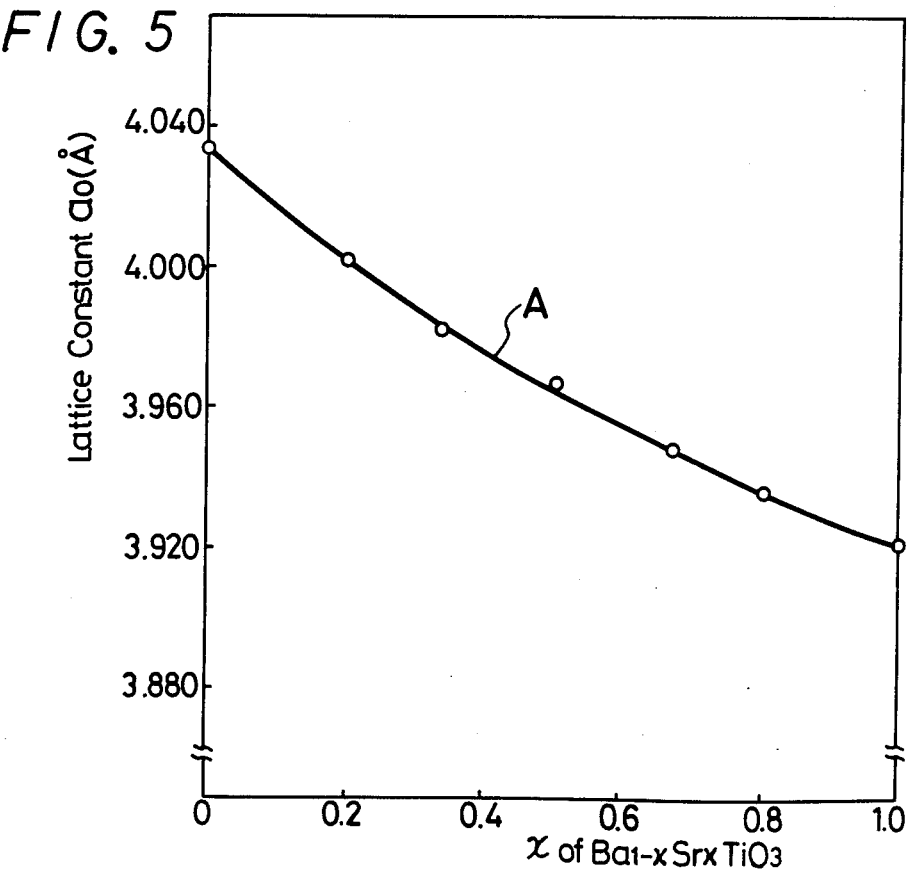
FIG. 5 is a characteristic graph showing a relation between a lattice constant and content of Sr.

Regarding the $Ba_{1-x}Sr_xTiO_3$ fine powders obtained in Examples 1 to 5, a characteristic graph showing a relation between the lattice constant $a_0$ and the value x is shown in FIG. 5. From this graph of FIG. 5, it was clear that a curve A substantially follows Vegard's law.

EXAMPLE 6

50 g of $TiCl_4$ was dissolved into 50 ml of an iced water while being stirred so as to make a Ti aqueous solution. Then, water was added thereto to prepare the aqueous solution of 500 ml. Next, this aqueous solution was adjusted to have pH 7 by adding an NaOH solution thereto. 66.52 g of $Ba(OH)_2 \cdot 8H_2O$ and 14.01 g of $Sr(OH)_2 \cdot 8H_2O$ were added and dissolved into this aqueous solution. Thereafter, this aqueous solution was adjusted to have pH 13.5 by adding an NaOH solution thereto and water was added thereto to prepare the aqueous solution of 1 l. While being stirred, this aqueous solution was reacted at 100° C. for four hours. The resultant precipitate was filtered, rinsed by water and then dried at 70° C. for two days long.

The X-ray diffraction pattern of the fine powder obtained by the above treatment is completely the same as that of FIG. 1 except for that the diffraction intensity is very slightly lowered as compared with that of FIG. 1. And, it was confirmed that this fine powder was barium-strontium titanate of cubic perovskite structure. In this case, the lattice constant $a_0$ thereof was 4.002 Å. Further, according to the transmission electron misroscope, the fine powder of substantially the same shape as that of FIG. 3 was observed.

EXAMPLE 7

The respective fine powders synthesized in Examples 1 to 5 were used and subjected to heat treatment at 800° C. for 2 hours in the atmosphere. Thereafter, they are pressed at 1500 kg/cm² and molded so as to make disc-shape products. After the respective disc-shape products were fired at 1300° C. (the rising speed of temperature was 100° C./hour) for two hours in the atmosphere, the change of temperature of dielectric constant $\epsilon$ (the temperature change of electrostatic capacitance) thereof were measured at 1 kHz. By way of example, a characteristic graph showing the results in which the capacitance of the disc-shape products made of $Ba_{0.8}Sr_{0.2}TiO_3$ fine powder was measured was shown in FIG. 4. Since no additives to improve sintering property was used, the density did not reach the vicinity of 100% of the theoretical density so that the true dielectric constant can not be obtained. However, it may be considered that the temperature where the peak value was obtained is substantially equal to Curie temperature Tc.

Figure 6:
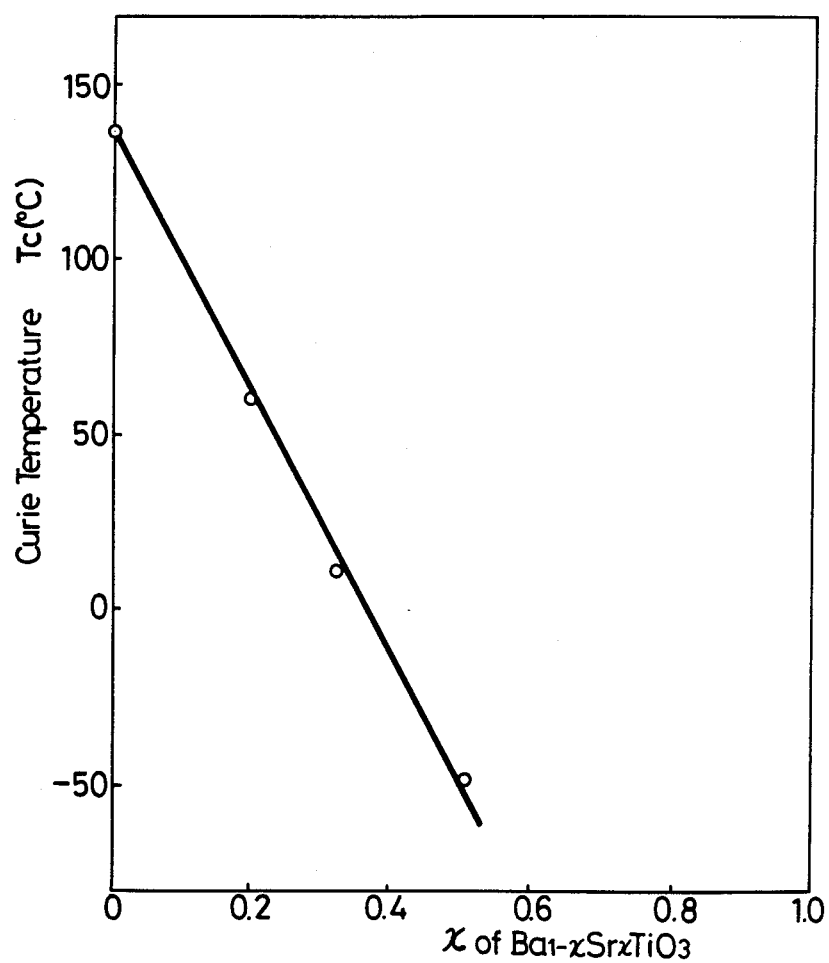
FIG. 6 is a characteristic graph showing a relation between Curie temperature and content of Sr.

FIG. 6 is a characteristic graph showing a relation between Curie temperature Tc and the value x of $Ba_{1-x}Sr_xTiO_3$. This characteristic graph of FIG. 6 makes it clear that according to this invention, it is possible to obtain the dielectric material in which the maximum value of the dielectric constant is set at a desired temperature (not higher than 135° C.).

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A method for manufacturing dielectric titanate fine powder having the formula $Ba_{1-x}Sr_xTiO_3$ wherein $0<x<1$ comprising the steps of: p1 preparing a hydrolysis product of an inorganic titanium compound, said hydrolysis product being a hydrate of $TiO_2$ by dissolving said inorganic titanium compound in a neutral or alkaline aqueous solution, reacting said hydrolysis product with a water soluble salt of Ba and a water soluble salt of Sr in an aqueous alkaline solution having a pH not less than 13.0 to thereby obtain said dielectric fine powder having the formula $Ba_{1-x}Sr_xTiO_3$ wherein $0<x<1$; and filtering said fine powder from the remaining solution.

2. A method for manufacturing dielectric titanate fine powder according to claim 1, in which a molar ratio of (Ba+Sr)/Ti is in the range from 0.5 to 5.0.

3. A method for manufacturing dielectric titanate fine powder according to claim 1, in which the reaction temperature is in the range from 15° C. to the boiling point of the reaction mixture.

* * * * *